(12) United States Patent
Acker et al.

(10) Patent No.: US 12,496,994 B2
(45) Date of Patent: Dec. 16, 2025

(54) CENTRAL AIRBAG, AND VEHICLE OCCUPANT RESTRAINT SYSTEM HAVING A CENTRAL AIRBAG

(71) Applicant: ZF AUTOMOTIVE GERMANY GMBH, Alfdorf (DE)

(72) Inventors: Dominique Acker, Gschwend (DE); Kathrin Weinhardt, Mutlangen (DE); Jürgen Scherr, Waldstetten (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 18/556,005

(22) PCT Filed: Apr. 14, 2022

(86) PCT No.: PCT/EP2022/060080
§ 371 (c)(1),
(2) Date: Oct. 18, 2023

(87) PCT Pub. No.: WO2022/223454
PCT Pub. Date: Oct. 27, 2022

(65) Prior Publication Data
US 2024/0198950 A1 Jun. 20, 2024

(30) Foreign Application Priority Data
Apr. 22, 2021 (DE) ...................... 10 2021 110 217.0

(51) Int. Cl.
*B60R 21/231* (2011.01)

(52) U.S. Cl.
CPC ................. *B60R 21/23138* (2013.01); *B60R 2021/23146* (2013.01); *B60R 2021/23161* (2013.01)

(58) Field of Classification Search
CPC .... B60R 21/23138; B60R 2021/23146; B60R 2021/23161
See application file for complete search history.

(56) References Cited

U.S. PATENT DOCUMENTS

| 8,840,135 B2 * | 9/2014 | Jenny | B60R 21/20 |
| | | | 280/730.2 |
| 10,814,824 B2 * | 10/2020 | Song | B60R 21/233 |

(Continued)

FOREIGN PATENT DOCUMENTS

| DE | 102012224178 A1 | 3/2013 |
| DE | 102015010809 A1 | 2/2017 |

(Continued)

OTHER PUBLICATIONS

PCT International Search Report for corresponding International Application Serial No. PCT/EP2022/060080, mailed Aug. 3, 2022, pp. 1-5.

*Primary Examiner* — Toan C To
(74) *Attorney, Agent, or Firm* — Tarolli, Sundheim, Covell & Tummino LLP

(57) ABSTRACT

The invention describes a center airbag (10) of a vehicle occupant restraint system (2) which is provided to be mounted on and/or in a vehicle seat (12) on a side facing another vehicle seat (14), comprising an inner fabric layer (16) and an outer fabric layer (18), wherein the inner fabric layer (16) is connected to the outer fabric layer (18) at least at the edge, wherein the center airbag (10) includes a thorax area (20), a shoulder area (22) and a head area (24), wherein, in a deployed and filled state, the thorax area (20) is arranged in a lower portion of the center airbag (10), specifically in the lower third, and includes a chamber area (26) having a higher thickness ($d_K$) than a thickness (d) in the shoulder area (22), wherein the chamber area (26) in the deployed and (Continued)

filled state of the center airbag (10) is interposed between a vehicle structure, specifically the center console (42), and a vehicle occupant (40).

14 Claims, 2 Drawing Sheets

(56) References Cited

U.S. PATENT DOCUMENTS

| | | | | |
|---|---|---|---|---|
| 10,974,686 B2* | 4/2021 | Moon | .................... | B60R 21/207 |
| 11,230,250 B2* | 1/2022 | Sturm | .................. | B60R 21/2338 |
| 11,912,225 B2* | 2/2024 | Azuma | ............. | B60R 21/23138 |
| 11,919,468 B2* | 3/2024 | Acker | ............... | B60R 21/23138 |
| 2012/0126518 A1* | 5/2012 | Fukawatase | .......... | B60R 21/207 |
| | | | | 280/730.2 |
| 2013/0069347 A1* | 3/2013 | Jenny | ................. | B60R 21/2346 |
| | | | | 280/730.1 |
| 2014/0151984 A1* | 6/2014 | Fukawatase | ...... | B60R 21/23138 |
| | | | | 280/730.2 |
| 2017/0158158 A1* | 6/2017 | Thomas | ................ | B60R 21/233 |
| 2017/0305382 A1 | 10/2017 | Wiik | | |
| 2019/0092271 A1* | 3/2019 | Park | ................... | B60R 21/23138 |
| 2019/0161052 A1* | 5/2019 | Steiner | ................ | B60R 21/2338 |
| 2019/0389421 A1* | 12/2019 | Sturm | ................... | B60R 21/207 |
| 2020/0254961 A1* | 8/2020 | Gwon | ............... | B60R 21/23138 |
| 2020/0406854 A1 | 12/2020 | Moon | | |
| 2021/0170978 A1* | 6/2021 | Acker | ..................... | B60R 21/23 |
| 2021/0370863 A1* | 12/2021 | Gwon | .................. | B60R 21/2338 |
| 2022/0242356 A1* | 8/2022 | Bogdanovic | ...... | B60R 21/23138 |

FOREIGN PATENT DOCUMENTS

| | | |
|---|---|---|
| DE | 102016010249 A1 | 3/2018 |
| DE | 202019103576 U1 | 7/2019 |
| DE | 102018211851 A1 | 1/2020 |
| DE | 102022109675 A1 * | 1/2023 |
| EP | 3378709 A1 | 9/2018 |
| WO | 2020/255817 A1 | 12/2020 |

* cited by examiner

CENTRAL AIRBAG, AND VEHICLE OCCUPANT RESTRAINT SYSTEM HAVING A CENTRAL AIRBAG

RELATED APPLICATIONS

This application is a U.S. National Stage Application filed under 35 USC 371, claiming priority to Serial No. PCT/EP2022/060080, filed on 14 Apr. 2022; which claims priority from German Patent Application DE 10 2021 110 217.0, filed 22 Apr. 2021, the entireties of which are hereby incorporated herein by reference.

TECHNICAL FIELD

The invention relates to a center airbag according to the preamble of claim 1 and to a vehicle occupant restraint system comprising a center airbag according to the preamble of claim 10.

BACKGROUND

State of the Art

For better protection of the torso and specifically the head of a vehicle occupant by an airbag, said body parts are intended to be restrained as early as possible by an airbag.

It is also known from the state of the art to interpose an airbag between two vehicle seats so as to prevent the vehicle occupant from colliding in the event of a side crash. Such airbag is also referred to as center airbag. The airbag also protects the associated vehicle occupant from over-swinging beyond his/her seat so that the vehicle occupant does not hit hard structures of the vehicle interior of the neighboring side.

From the state of the art already various center airbags are known. DE 10 2018 120 880 A1, for example, shows a center airbag having a separately formed gas bag cushion, with a head gas bag being attached onto the torso gas bag on a side associated with the occupant and being filled via flow orifices in the area of the connection.

SUMMARY

Problem of the Invention

It is the problem of the invention to provide a cost-effective and easy-to-manufacture alternative to the center airbags known from the state of the art. In addition, it is the problem of the invention to provide a vehicle occupant restraint system comprising a cost-effective and easy-to-manufacture center airbag.

Solution of the Problem

The features according to the claims 1 and 10 result in the solution of the problem. Advantageous configurations are described in the subclaims.

A center airbag according to the invention of a vehicle occupant restraint system is provided to be mounted on and/or in a vehicle seat on a side facing another vehicle seat. The center airbag according to the invention has inner and outer fabric layers. The inner fabric layer is connected, such as sewn, glued or woven, to the outer fabric layer at least at the edge. The center airbag comprises a thorax area, a shoulder area and a head area. In the deployed and filled state, the thorax area, the shoulder area and the head area preferably are portions of the center airbag which are arranged on top of each other along a vertical axis of the vehicle. The thorax area is disposed, in the deployed and filled state, in a lower portion of the center airbag, specifically in the lower third, and has a chamber area having a thickness in the transverse direction of the vehicle which is larger than a thickness of the center airbag in the shoulder area. According to the invention, in the deployed and filled state of the center airbag, the chamber area is interposed between a vehicle structure and the vehicle occupant. In typical embodiments, the vehicle structure may be a center console of the vehicle.

Due to the increased thickness in the chamber area, a kind of bubble is formed between the vehicle structure such as the center console and the vehicle occupant, causing the deployed center airbag to be stabilized and, moreover, the vehicle occupant to be supported.

In a typical embodiment, the vehicle seat in and/or on which the center airbag is mounted, can be a driver seat and the further seat can be a passenger seat.

The inner fabric layer of the center airbag in a filled and deployed state of the center airbag faces a vehicle occupant seated in the vehicle seat in and/or on which the center airbag or, resp., the center airbag module comprising the center airbag is arranged.

In a preferred embodiment, the inner fabric layer has a gathering seam. The gathering seam introduced to the inner fabric layer can help achieve that in the deployed and filled state the center airbag is curved toward the vehicle occupant.

Preferably, in the shoulder area of the center airbag, the gathering seam is introduced to the inner fabric layer, specifically a front portion of the center airbag in the longitudinal direction of the vehicle. Such an arrangement can help obtain an advantageous curvature of the center airbag specifically in the direction of a head of the vehicle occupant.

Alternatively, or additionally, in the shoulder area formed particularly by a central third of the center airbag, a shoulder recess may be arranged. In the area of the shoulder recess, the center airbag has a smaller thickness than in the portion of the shoulder area surrounding the shoulder recess.

The shoulder recess can be created in particular by connecting the inner fabric layer to the outer fabric layer. The connection of the inner fabric layer with the outer fabric layer can be established, for example, by at least partially sewing, gluing and/or weaving.

Preferably, the inner fabric layer is connected to the outer fabric layer in the area of the shoulder recess such that a portion which cannot be filled with gas is formed.

Moreover, additionally or alternatively tethers and/or fabric sections can be used to connect the inner fabric layer to the outer fabric layer. In those embodiments, the inner fabric layer and the outer fabric layer can be connected in the portion of the shoulder recess in such a way that a portion which cannot be filled with gas, a portion which can be partly filled with gas or a portion which can be completely filled with gas is formed.

In an integrally woven center airbag, the tethers can further be formed by alternating warp and weft threads which, for this purpose, in the manufacturing process are passed in the portion of the shoulder recess from the inner fabric layer to the outer fabric layer and/or vice versa. In such embodiment, the shoulder recess is formed by a portion which can be filled with gas.

The volume of the center airbag can be reduced by the shoulder recess. In addition, this results in the advantage that the expansion of the airbag in the longitudinal direction of the vehicle remains the same, while the expansion in the transverse direction of the vehicle can be reduced and, thus, a contour is created which, in the deployed and filled state, fits around one shoulder of the vehicle occupant.

Further, the center airbag can comprise a gas distributor disposed in the area of the inflation mouth of the center airbag. Preferably, such gas distributor is in the form of a fabric gas distributor.

The gas distributor in a typical embodiment encloses, in a completely mounted state of the center airbag module, at least partially the inflator by which the center airbag is filled with gas. The fabric distributor preferably encloses the inflator at least in the area of the discharge openings of the inflator. In this way, direct flow of the hot gas generated by the inflator to the inner and outer fabric layers can be prevented.

In addition, the gas distributor particularly prevents hot gas from directly flowing out in the direction of the shoulder recess when the center airbag is filled. Hereby the gas generated by the inflator can be easily prevented from flowing directly to a seam, for example, which connects the inner fabric layer to the outer fabric layer in the portion of the shoulder recess.

Furthermore, the gas generated by the inflator can be redirected in a specific way so as to achieve the most ideal deployment possible of the center airbag.

In an embodiment, the fabric distributor is designed so that a first outlet opening is directed toward the thorax area, in particular toward the chamber area having the increased thickness, of the center airbag. This can help achieve improved deployment and positioning of the center airbag downwards in the vertical direction of the vehicle.

In an embodiment, the center airbag includes a combination of the afore-described embodiments, in particular comprising a shoulder recess in which the inner fabric layer is connected to the outer fabric layer in such a manner that a portion which cannot be filled with gas is formed.

The problem according to the invention is also solved by a vehicle occupant restraint system comprising the features of claim 10.

The vehicle occupant restraint system according to the invention comprises a center airbag as set forth in one of the afore-described embodiments. Here, the center airbag is mounted particularly to a driver seat of the vehicle on the side facing the passenger seat of the vehicle. Accordingly, the center airbag may be mounted directly on the vehicle seat structure, for example, or else in a center airbag module mounted on the vehicle seat structure and comprising at least one inflator in addition to the center airbag.

As a matter of course, the center airbag or the center airbag module can be mounted, in further embodiments, on each vehicle seat of the vehicle on a side facing another vehicle seat. In addition, the center airbag or the center airbag module can also be mounted on a side facing a vehicle body and can be used as a side airbag.

BRIEF DESCRIPTION OF DRAWINGS

Further advantages, features and details of the invention will be evident from the following description of an embodiment which is not to be understood as limiting, as well as by way of the drawings, wherein.

DESCRIPTION

Figure 1:
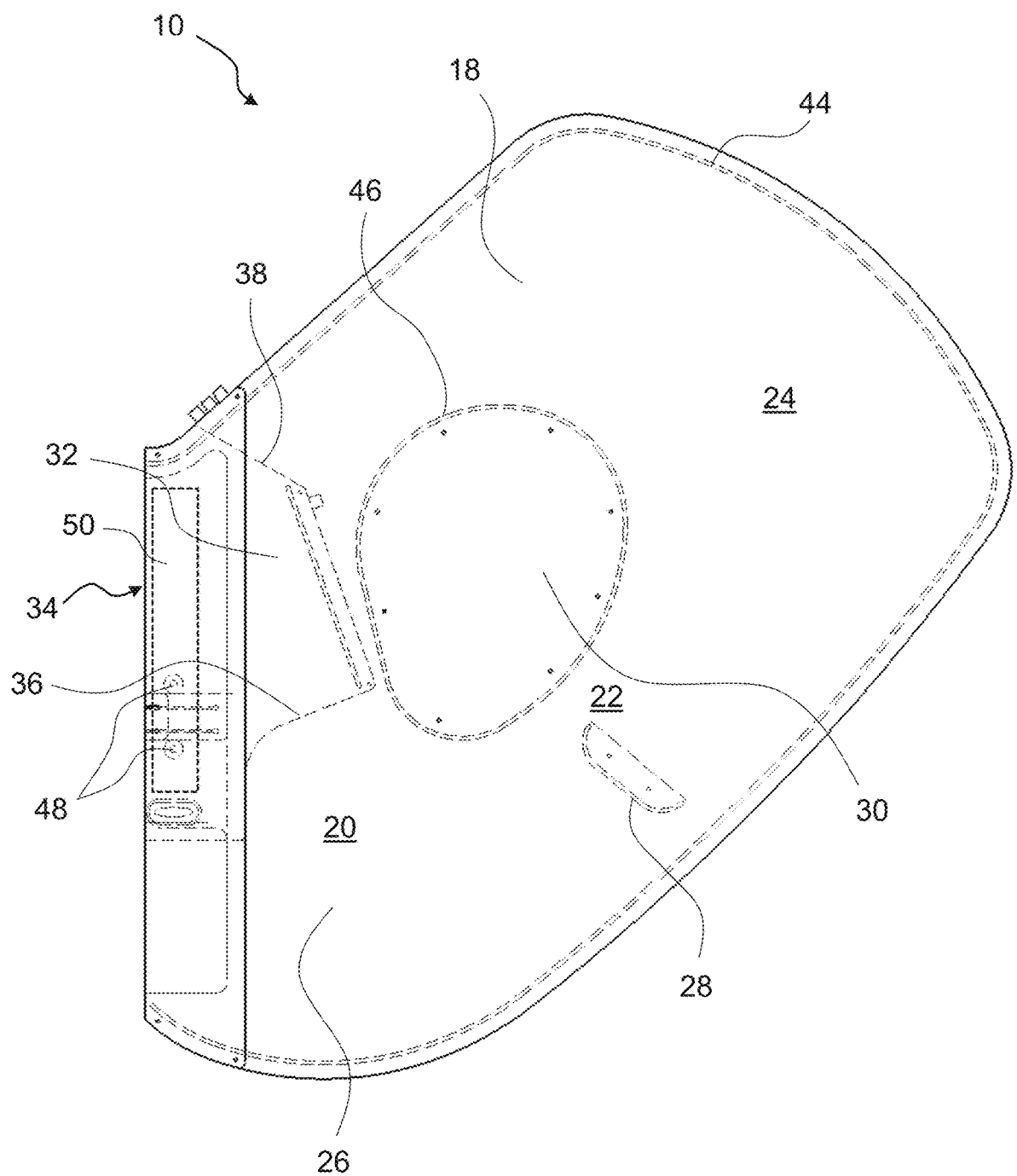
FIG. 1 shows a schematic view of an embodiment according to the invention of a flatly spread non-inflated center airbag.
Figure 2:
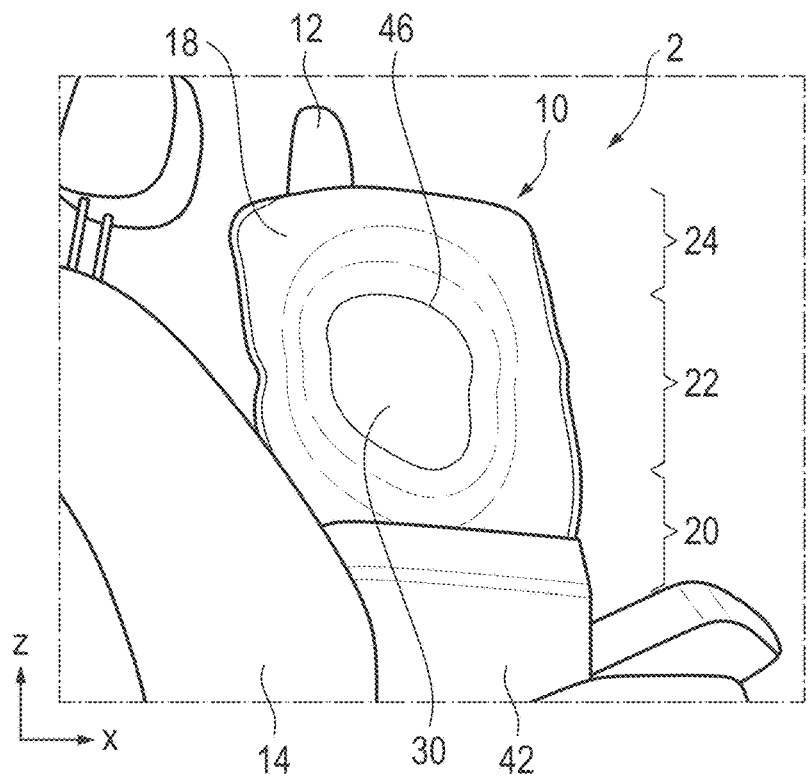
FIG. 2 shows a schematic lateral view of a vehicle occupant restraint system according to the invention comprising a completely inflated center airbag according to FIG. 1 in a situation of restraint.
Figure 3:
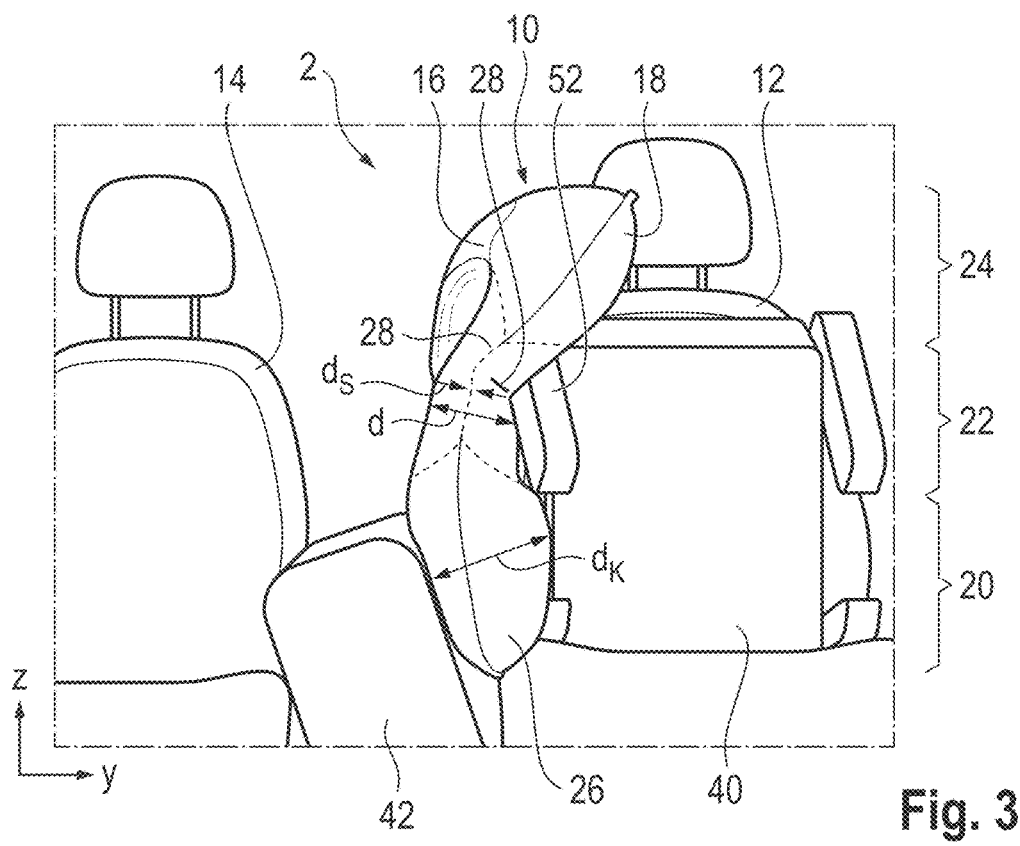
FIG. 3 shows a schematic front view of the center airbag of the vehicle occupant restraint system according to FIG. 2.

FIG. 1 illustrates an embodiment of a center airbag 10 according to the invention for a vehicle occupant restraint system 2. The center airbag 10 of the vehicle occupant restraint system 2 is mounted, as shown in FIGS. 2 and 3, on and/or in a vehicle seat 12, here a driver seat 12, on a side facing another vehicle seat 14, here a passenger seat 14.

The center airbag 10 of the shown embodiment is fastened in a folded state, specifically as an element of a center airbag module, to a frame structure of the vehicle seat 12, for example, via inflator bolts (not shown) of the schematically illustrated inflator 50. For this purpose, the illustrated center airbag 10 includes fastening holes 48 for the inflator bolts of the inflator 50 in the area of the inflation mouth 34.

The center airbag 10 comprises an inner fabric layer 16 (see FIG. 3) and an outer fabric layer 18 which are interconnected by an edge-side seam 44.

The center airbag 10 comprises a thorax area 20, a shoulder area 22 and a head area 24. In the deployed and filled state, the thorax area 20 is disposed substantially laterally next to the pelvic area, the shoulder area is disposed substantially laterally next to the shoulder area, and the head area is disposed substantially laterally next to the head of the vehicle occupant 40.

The thorax area 20 is disposed, in the deployed and filled state (see FIG. 3), in a lower portion of the center airbag 10, in particular in a lower third of the center airbag 10 in the vertical direction z of the vehicle. The thorax area 20 has a chamber area 26 which has, in the deployed and filled state, a higher thickness dK compared to the thickness d in the shoulder area 22.

The chamber area 26 of the thorax area 20 is interposed, in the deployed and filled state of the center airbag 10, substantially between a vehicle structure, here the center console 42, and a vehicle occupant 40 illustrated by a dummy in this case. The center airbag 10 is stabilized and, in addition, the vehicle occupant 40 is supported by the chamber area 26 having the increased thickness dK.

The center airbag 10 shown in the Figures further includes a gathering seam 28 introduced into the inner fabric layer 16. The gathering seam 28 in the shown embodiment is introduced into the inner fabric layer 16 in the shoulder area 22 of the center airbag 10 in a front portion of the center airbag 10 in the longitudinal direction x of the vehicle. As illustrated in FIG. 3, in the deployed and filled state, the center airbag 10 is curved toward the vehicle occupant 40 by the gathering seam 28.

The shown center airbag 10 further includes a shoulder recess 30 arranged in the shoulder area 22. The shoulder area 22 has a smaller thickness dS in the portion of the shoulder recess 30.

The shoulder recess 30 in the shown embodiment is created by the inner fabric layer 16 being connected to the outer fabric layer 18 by a seam 46. The inner fabric layer 16 is connected to the outer fabric layer 18 by the seam 46 such that the portion of the shoulder recess 30 is not filled with gas. The shoulder recess 30 having the lower thickness dS can help achieve that the airbag volume is reduced, thereby less gas being required for filling the center airbag 10.

Moreover, the expansion/thickness of the center airbag 10 in the transverse direction y of the vehicle can be reduced by the shoulder recess 30 without reducing the expansion/length of the center airbag 10 in the longitudinal direction x of the vehicle. As a result, in the portion of the shoulder recess 30 the center airbag 10 fits around the shoulder 52 of the vehicle occupant 40 (see FIG. 3).

The illustrated center airbag 10 further comprises a gas distributor 32 that is arranged in the portion of the inflation mouth 34 in the center airbag 10 and encloses at least the outflow area of the inflator 50. The gas distributor 32 redirects the gas exiting the inflator 50 during the filling of the center airbag 10 in such a way that the connection of the inner fabric layer 16 with the outer fabric layer 18 is not directly exposed to the flow in the portion of the shoulder recess 30, in this case the seam 46, and is thus protected.

The illustrated gas distributor 32 includes a first outlet opening 36 and a second outlet opening 38. The first outlet opening 36 is directed toward the thorax area 20 of the center airbag 10 and is designed so that the best possible deployment and positioning of the center airbag 10 downwards in the vertical direction z of the vehicle can be achieved.

The gas distributor 32 in the illustrated embodiment is in the form of a fabric gas distributor 32 which is preferably made of a common fabric for airbags.

The invention claimed is:

1. A center airbag of a vehicle occupant restraint system which is provided to be mounted on and/or in a vehicle seat on a side facing another vehicle seat, comprising an inner fabric layer and an outer fabric layer, wherein the inner fabric layer is connected to the outer fabric layer at least at the edge, wherein the center airbag includes a thorax area, a shoulder area, and a head area, wherein the thorax area is arranged, in a deployed and filled state, in a lower portion of the center airbag and includes a chamber area having a higher thickness than a thickness in the shoulder area, wherein the chamber area in the deployed and filled state of the center airbag is interposed between a center console of the vehicle and a vehicle occupant, wherein the inner fabric layer includes a gathering seam, the gathering seam in the shoulder area of the center airbag is introduced to the inner fabric layer so that, in the deployed and filled state, the center airbag is curved toward the vehicle occupant, and wherein the gathering seam is in a front section of the shoulder area of the center airbag.

2. The center airbag according to claim 1, wherein the thorax area is arranged, in a deployed and filled state, in a lower third portion of the center airbag.

3. The center airbag according to claim 1, wherein a shoulder recess is arranged in the shoulder area.

4. The center airbag according to claim 3, wherein the shoulder area has a lower thickness in the portion of the shoulder recess.

5. The center airbag according to claim 3, wherein the shoulder recess is created by connecting the inner fabric layer to the outer fabric layer.

6. The center airbag according to claim 3, wherein the shoulder recess is created by connecting the inner fabric layer to the outer fabric layer such that the shoulder recess is formed by a portion which cannot be filled with gas.

7. The center airbag according to claim 1, comprising a gas distributor in the portion of an inflation mouth.

8. The center airbag according to claim 7, wherein the gas distributor is a fabric gas distributor.

9. The center airbag according to claim 7, wherein the gas distributor prevents gas from directly flowing out in the direction of the shoulder recess when the center airbag is filled.

10. The center airbag according to claim 7, wherein a first outlet opening of the gas distributor is directed toward the thorax area of the center airbag.

11. A vehicle occupant restraint system comprising a center airbag according to claim 1, wherein the center airbag is mounted on a driver seat of a vehicle on the side facing a passenger seat of the vehicle.

12. A center airbag of a vehicle occupant restraint system which is provided to be mounted on and/or in a vehicle seat on a side facing another vehicle seat, comprising an inner fabric layer and an outer fabric layer, wherein the inner fabric layer is connected to the outer fabric layer at least at the edge, wherein the center airbag includes a thorax area, a shoulder area, and a head area, wherein the thorax area is arranged, in a deployed and filled state, in a lower portion of the center airbag and includes a chamber area having a higher thickness than a thickness in the shoulder area, wherein the chamber area in the deployed and filled state of the center airbag is interposed between a center console of the vehicle and a vehicle occupant, wherein a shoulder recess is arranged in the shoulder area, the shoulder recess being created by connecting the inner fabric layer to the outer fabric layer such that the shoulder recess is formed by a portion which cannot be filled with gas.

13. A center airbag of a vehicle occupant restraint system which is provided to be mounted on and/or in a vehicle seat on a side facing another vehicle seat, comprising an inner fabric layer and an outer fabric layer, wherein the inner fabric layer is connected to the outer fabric layer at least at the edge, wherein the center airbag includes a thorax area, a shoulder area, and a head area, wherein the thorax area is arranged, in a deployed and filled state, in a lower portion of the center airbag and includes a chamber area having a higher thickness than a thickness in the shoulder area, wherein the chamber area in the deployed and filled state of the center airbag is interposed between a center console of the vehicle and a vehicle occupant, wherein the center airbag further comprises a gas distributor in the portion of an inflation mouth, the gas distributor preventing gas from directly flowing out in the direction of the shoulder recess when the center airbag is filled.

14. A center airbag of a vehicle occupant restraint system which is provided to be mounted on and/or in a vehicle seat on a side facing another vehicle seat, comprising an inner fabric layer and an outer fabric layer, wherein the inner fabric layer is connected to the outer fabric layer at least at the edge, wherein the center airbag includes a thorax area, a shoulder area, and a head area, wherein the thorax area is arranged, in a deployed and filled state, in a lower portion of the center airbag and includes a chamber area having a higher thickness than a thickness in the shoulder area, wherein the chamber area in the deployed and filled state of the center airbag is interposed between a center console of the vehicle and a vehicle occupant, wherein the center airbag further comprises a gas distributor in the portion of an inflation mouth, wherein a first outlet opening of the gas distributor is directed toward the thorax area of the center airbag.

* * * * *